(12) United States Patent
Kim (10) Patent No.: US 8,977,226 B2
(45) Date of Patent: Mar. 10, 2015

(54) MOBILE TERMINAL

(71) Applicant: LG Electronics Inc., Seoul (KR)

(72) Inventor: Hoonyong Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 13/733,003

(22) Filed: Jan. 2, 2013

(65) Prior Publication Data

US 2013/0172056 A1  Jul. 4, 2013

(30) Foreign Application Priority Data

Jan. 3, 2012 (KR) ........................ 10-2012-0000585

(51) Int. Cl.
| | |
|---|---|
| *H04B 1/10* | (2006.01) |
| *H04B 15/06* | (2006.01) |
| *H01Q 1/24* | (2006.01) |
| *H01Q 1/52* | (2006.01) |
| *H04M 1/02* | (2006.01) |

(52) U.S. Cl.
CPC ............... *H04B 1/1018* (2013.01); *H01Q 1/24* (2013.01); *H01Q 1/243* (2013.01); *H01Q 1/52* (2013.01); *H04B 1/109* (2013.01); *H04M 1/0202* (2013.01); *H04B 1/525* (2013.01)
USPC .......... 455/317; 455/48; 455/114.2; 455/283; 455/284; 455/570

(58) Field of Classification Search
USPC ................. 455/571, 101, 102, 132, 317, 570, 455/114.2, 78, 113, 283, 84, 296
See application file for complete search history.

(56) References Cited

U.S. PATENT DOCUMENTS

| | | | |
|---|---|---|---|
| 6,313,874 B1* | 11/2001 | Bowyer et al. ................ 348/180 |
| 2005/0059358 A1* | 3/2005 | Block et al. ..................... 455/78 |
| 2005/0227631 A1* | 10/2005 | Robinett .......................... 455/83 |
| 2013/0154868 A1* | 6/2013 | Kehrer et al. ................... 342/16 |

* cited by examiner

*Primary Examiner* — Yuwen Pan
*Assistant Examiner* — Fatuma Sherif
(74) *Attorney, Agent, or Firm* — Birch, Stewart, Kolasch & Birch, LLP (57) ABSTRACT

A mobile terminal including a transceiver having a plurality of output terminals; a plurality of power amplifier units respectively connected to the plurality of output terminals, and configured to amplify a first or second signal output by the output terminals and to output the amplified first or second signal to a plurality of antennas respectively connected the plurality of power amplifiers; and a receiving module configured to receive a third signal through a receiving antenna disposed to be spaced apart from the plurality of antennas and to output the received third signal to the transceiver. Further, the receiving module includes first and second filters configured to control an intermodulation distortion (IMD) signal included in the third signal due to the output of the first or second signal.

16 Claims, 8 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2012-0000585, filed on Jan. 3, 2012, the contents of which is incorporated by reference herein in its entirety.

BACKGROUND OF THE INVENTION

1. Field of the Invention

The present disclosure relates to a mobile terminal, and more particularly, to a mobile terminal for supporting a plurality of mobile communication services.

2. Description of the Related Art

In general, a terminal may be classified into a mobile (portable) terminal and a stationary terminal. The mobile terminal may be also classified into a handheld terminal and a vehicle mount terminal.

In order to provide a plurality of mobile communication services such as global system for mobile communications (GSM), code division multiple access (CDMA), wideband code division multiple access (WCDMA), US personal communication system (UP-PCS) and long term evolution (LTE), the mobile terminal can be configured to transmit/receives signals of multi-frequency bands.

However, as the mobile terminal simultaneously processes the signal of the multi-frequency bands, intermodulation distortion (IMD) may occur, which causes a deterioration in reception sensitivity.

SUMMARY OF THE INVENTION

Therefore, an aspect of the detailed description is to provide a mobile terminal capable of reducing or removing intermodulation distortion (IMD) occurring as the mobile terminal simultaneously processes signals of multi-frequency bands.

To achieve these and other advantages and in accordance with the purpose of this specification, as embodied and broadly described herein, a mobile includes a transceiver having a plurality of output terminals; a plurality of power amplifier units respectively connected to the plurality of output terminals, and amplifying a first or second signal and outputting the amplified first or second signal to a plurality of antennas respectively connected thereto; and a receiving module receiving a third signal through a receiving antenna disposed to be spaced apart from the plurality of antennas and outputting the received third signal to the transceiver, wherein the receiving module includes first and second filters formed to control an intermodulation distortion (IMD) signal included in the third signal due to the first or second signal.

To achieve these and other advantages and in accordance with the purpose of this specification, as embodied and broadly described herein, a mobile terminal includes a transceiver having a plurality of output terminals, and outputting a first or second signal through any one of the output terminals; a plurality of power amplifier units connected to any one of the output terminals so as to amplify an input signal and output the amplified signal to a first antenna; and a receiving module receiving a third signal through a second antenna spaced apart from the first antenna and outputting the received third signal to the transceiver, wherein the receiving module includes first and second filters formed to control an IMD signal included in the third signal due to the first or second signal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF EMBODIMENTS

Hereinafter, a mobile terminal according to the present invention will be explained in more detail with reference to the attached drawings. The suffixes attached to components of the wireless speaker, such as 'module' and 'unit or portion' were used for facilitation of the detailed description of the present disclosure. Therefore, the suffixes do not have different meanings from each other.

The mobile terminal according to the present disclosure may include a portable phone, a smart phone, a laptop computer, a digital broadcasting terminal, Personal Digital Assistants (PDA), Portable Multimedia Player (PMP), a navigation system, etc.

For the sake of brief description with reference to the drawings, the same or equivalent components will be provided with the same reference numbers, and description thereof will not be repeated. A singular expression used in the present invention may include a plural concept unless there is a contextually distinctive difference therebetween.

Figure 1:
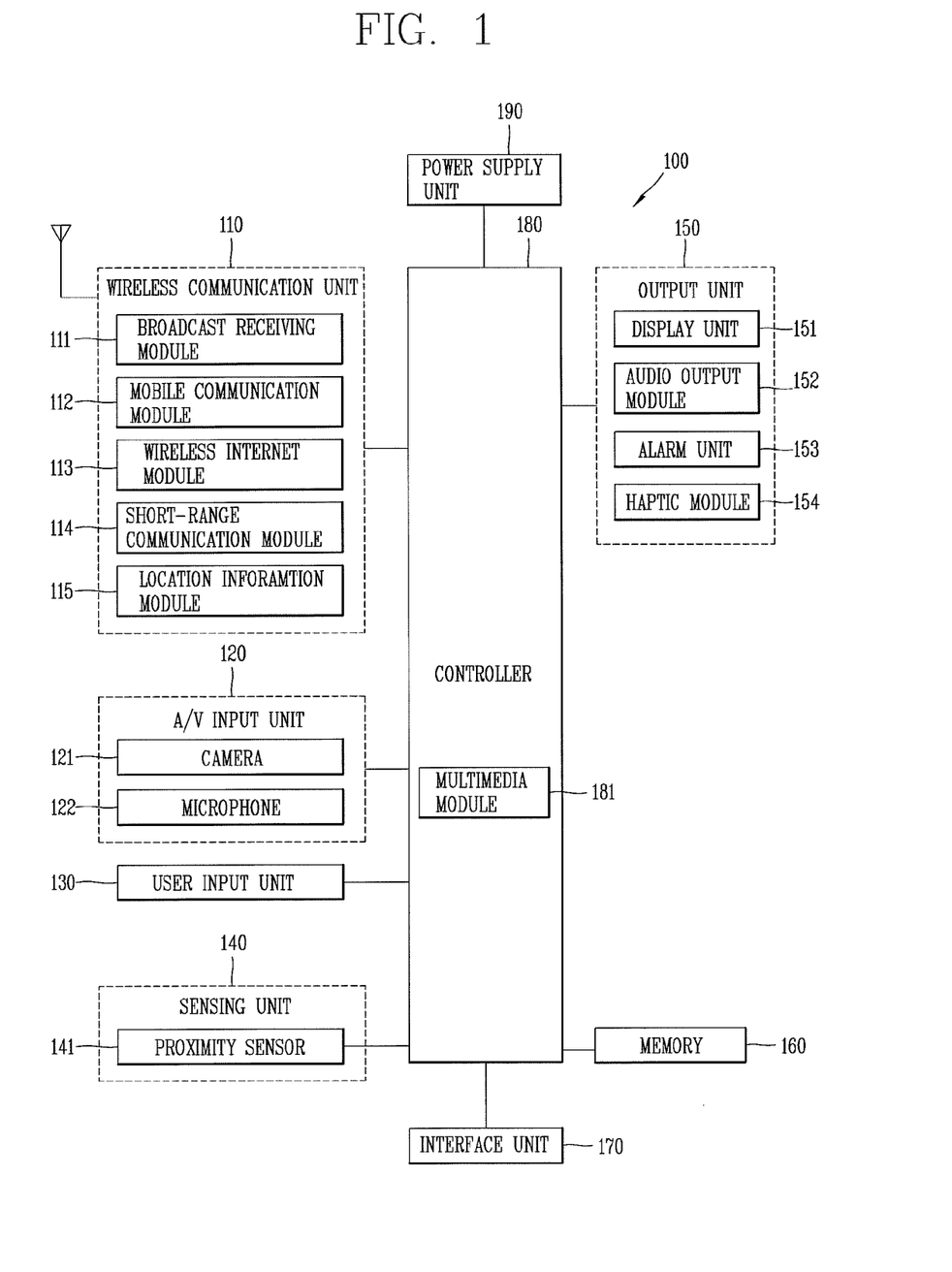
FIG. 1 is a block diagram of a mobile terminal according to an embodiment of the present invention.

FIG. 1 is a block diagram of a mobile terminal according to one embodiment of the present disclosure. The mobile terminal 100 may include components, such as a wireless communication unit 110, an Audio/Video (A/V) input unit 120, a user input unit 130, a sensing unit 140, an output module 150, a memory 160, an interface unit 170, a controller 180, a power supply unit 190, and the like. FIG. 1 shows the mobile terminal 100 having various components, but implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may be provided via a mobile communication network. In this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like. The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call or other communication (such as text messaging, multimedia file downloading, etc.). When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, the proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display 151 or the audio output module 152. Accordingly, the display 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image. The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
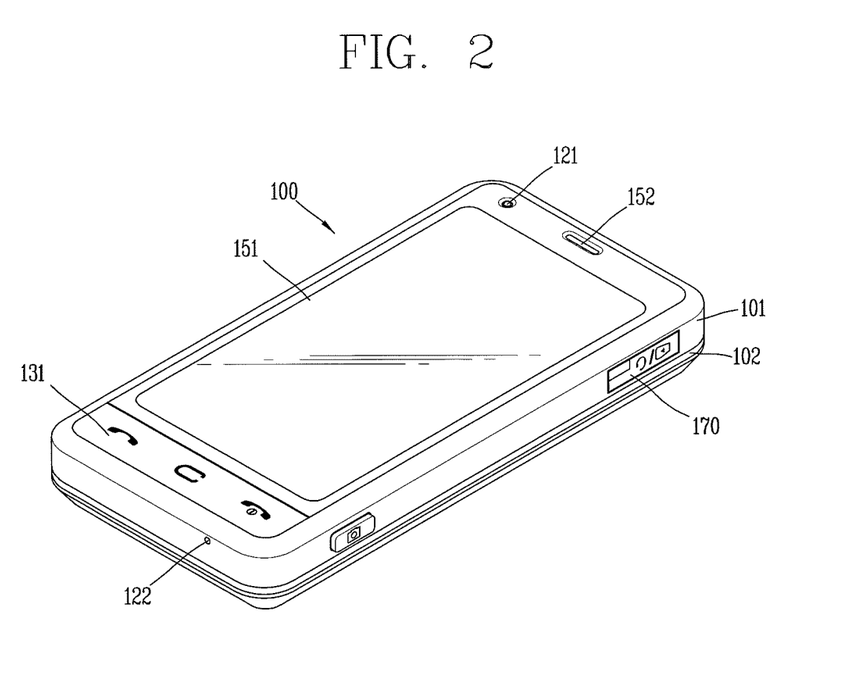
FIG. 2 is a perspective view illustrating an example of the mobile terminal viewed from the front.

Next, FIG. 2 is a front perspective view of a mobile terminal 100 according to the present invention. Referring to FIG. 2, the mobile terminal 100 according to an embodiment of the present invention is a bar type mobile terminal. However, the present invention is not limited to this, but may be applied to a slide type in which two or more bodies are coupled to each other so as to perform a relative motion, a folder type, or a swing type, a swivel type and the like.

A case (casing, housing, cover, etc.) which forms the appearance of a body may include a front case 101 and a rear case 102. A space formed by the front case 101 and the rear case 102 may accommodate various components therein. At least one intermediate case may be further disposed between the front case 101 and the rear case 102. Such cases may be formed by injection-molded synthetic resin, or may be formed using a metallic material such as stainless steel (STS) or titanium (Ti).

At the terminal body, may be disposed a display 151, an audio output unit 152, a camera 121, user input units 130, 131 and 132, a microphone 122, an interface unit 170, etc. The display 151 occupies most parts of a main surface of the front case 101. The audio output unit 152 and the camera 121 are arranged at a region close to one end of the display 151. The user input unit 131 and the microphone 122 are arranged at a region close to another end of the display 151. The user input unit 132, the interface unit 170, etc. may be disposed on side surfaces of the front case 101 and the rear case 102.

The user input unit 130 is manipulated to receive a command for controlling the operation of the mobile terminal 100, and may include a plurality of manipulation units 131 and 132. The manipulation units 131 and 132 may be referred to as manipulating portions, and may include any type of ones that can be manipulated in a user's tactile manner.

Commands input through the user input units 131 and 132 may be variously set. For instance, the first user input unit 131 is configured to input commands such as START, END, SCROLL or the like. The second user input unit 132 is configured to input commands for controlling a level of sound output from the audio output unit 152, or commands for converting the current mode of the display 151 to a touch recognition mode.

Figure 3:
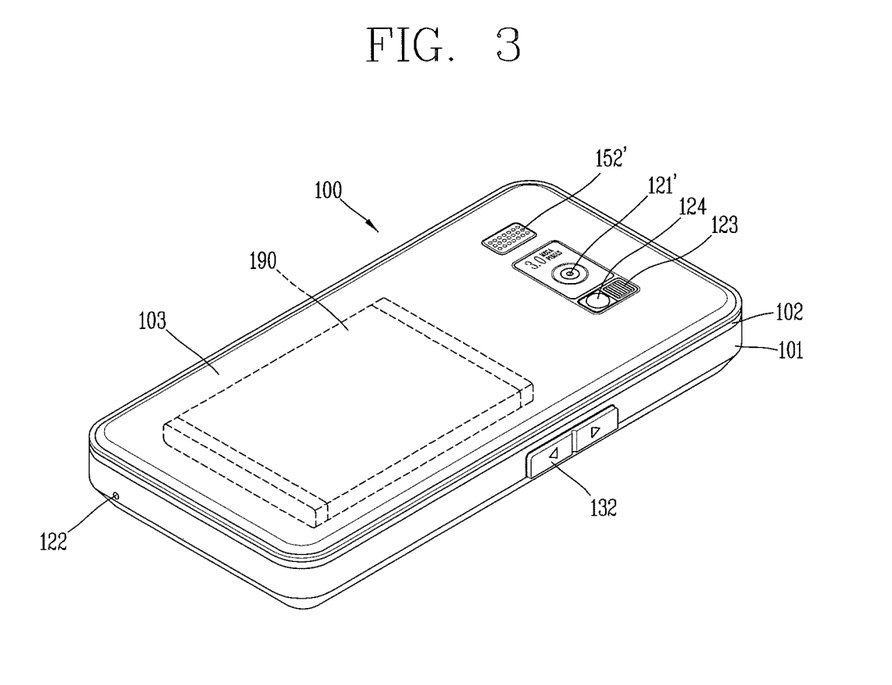
FIG. 3 is a rear perspective view of the mobile terminal shown in FIG. 2.

Next, FIG. 3 is a rear perspective view of the mobile terminal 100 of FIG. 2. Referring to FIG. 3, a camera 121' may be additionally provided on the rear case 102. The camera 121' faces a direction which is opposite to a direction faced by the camera 121 (refer to FIG. 2), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body so as to rotate or pop-up.

A flash 123 and a mirror 124 may be additionally disposed close to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 152' may be additionally arranged on a rear surface of the body. The audio output unit 152' disposed on the rear surface of the body may implement a stereo function, together with the audio output unit 152 (refer to FIG. 2) disposed on the front surface of the body. And, the audio output unit disposed on the rear surface of the body may be configured to operate as a speakerphone during a call.

Not only an antenna for calling, but also a broadcast signal receiving antenna may be disposed on the side surface of the terminal body. The antenna, part of the broadcast signal receiving module 111 (refer to FIG. 1) may be configured to retract into the terminal body.

A power supply unit 190 for supplying power to the mobile terminal 100 is mounted to the body. The power supply unit 190 may be implemented as a battery 191 (refer to FIG. 4). The battery 191 may be mounted in the body, or may be detachably mounted to the body. A battery cover 103 for restricting separation of the battery 191 may be detachably coupled to the rear case 102.

Figure 4:
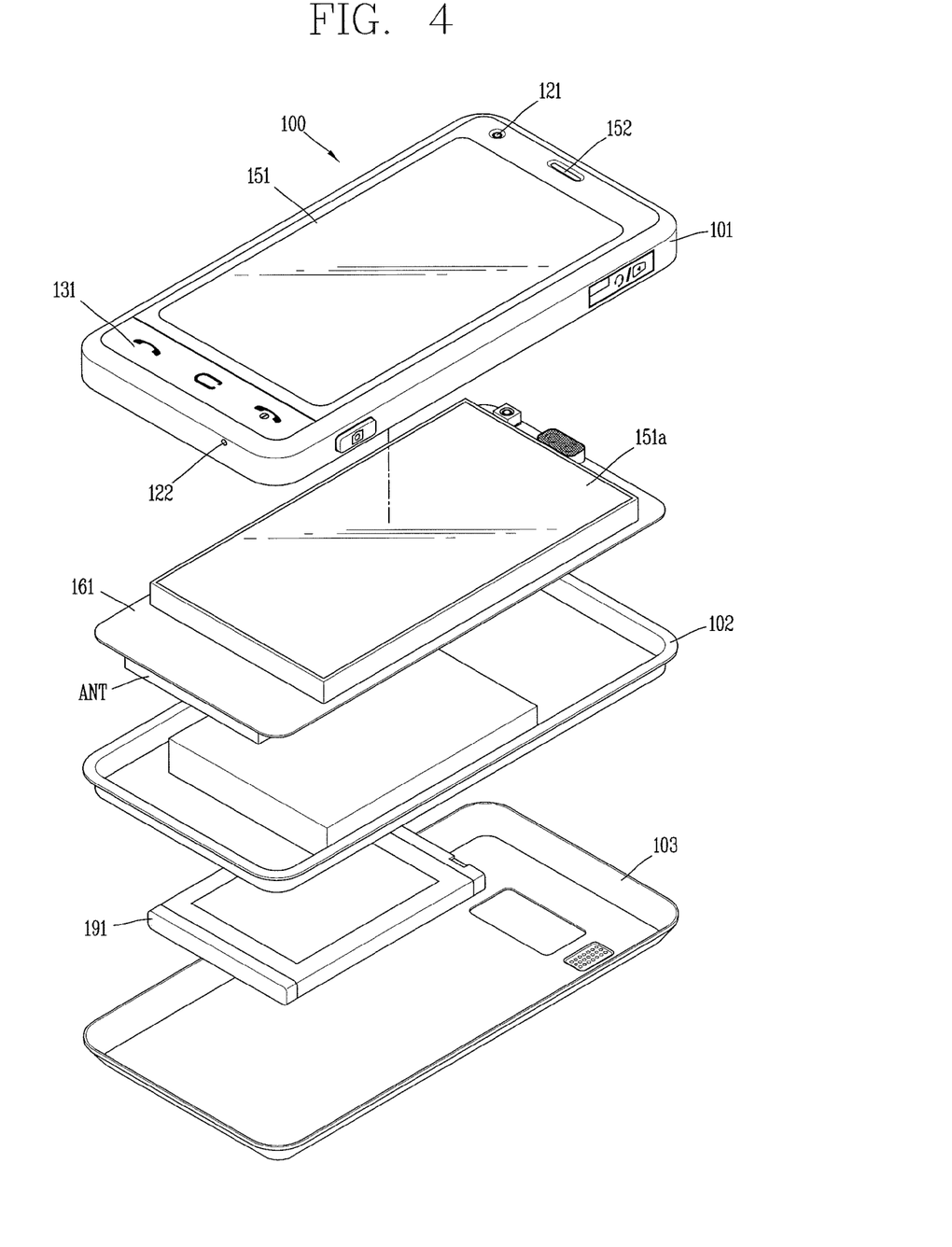
FIG. 4 is an exploded perspective view of the mobile terminal shown in FIG. 2.

FIG. 4 is an exploded perspective view of the mobile terminal 100 shown in FIG. 2. Referring to FIG. 4, a printed circuit board (PCB) 161 is disposed in an internal space of the terminal body. The PCB 161 may be mounted to occupy most of the main surface of the terminal body. The PCB 161 may be configured as an example of the control unit 180 (see FIG. 1) controlling the mobile terminal 100 so as to operate various functions of the mobile terminal 100. For example, the PCB 161 is configured to display (output) information processed in the mobile terminal 100 through a display 151*a*.

Electronic elements for operating the various functions of the mobile terminal 100 are mounted on at least one surface of the PCB 161. For example, the display 151*a*, the sound output module 152, the camera 121, etc. may be mounted on the one surface of the PCB 161.

Figure 5:
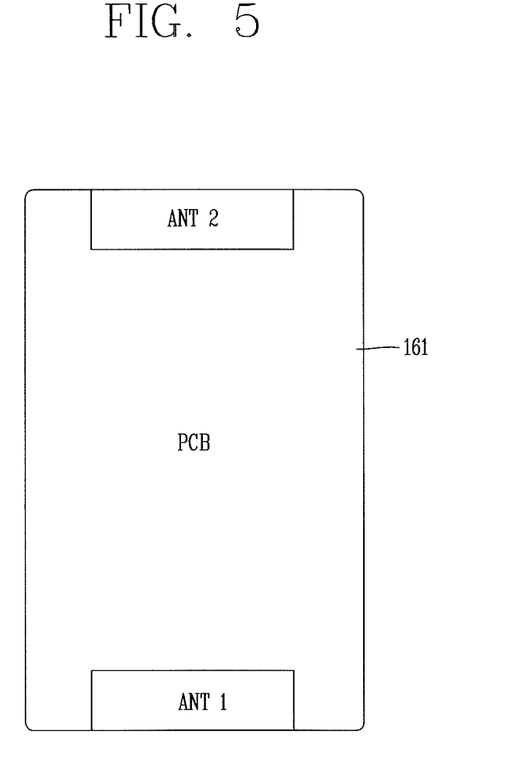
FIG. 5 is a conceptual view illustrating an example in which antennas are arranged in a mobile terminal.

Next, FIG. 5 is a conceptual view illustrating an example in which antennas are arranged in a mobile terminal. FIG. 5 illustrates that antennas may be arranged in a predetermined region of the mobile terminal. A first antenna is disposed at a lower end in the mobile terminal, and may be connected to a circuit board having a ground so that the circuit board supplies power thereto. On the other hand, a second antenna may be disposed at an upper end in the mobile terminal.

Thus, isolation characteristics can be improved due to the antennas arranged to be spaced apart from each other as described above. The mobile terminal may be a multi-mode and multi-band mobile terminal that provides, for example, US personal communication system (US-PCS), enhanced global packet radio service (EGRPS), universal mobile telecommunication system (UMTS) and code division multiple access (CDMA) communication services. The mobile terminal 200 may further provide a long term evolution (LTE) communication service. The mobile terminal 200 may be a multi-mode and multi-band mobile terminal that integrally provides second-generation (2G) and third-generation (3G) communication services.

The first antenna may be an antenna that operates in a multi-mode to integrally provide the US-PCS, CDMA and LTE communication services, and resonates in a multi-band. In addition, the second antenna may be an antenna that receives global positioning system (GPS)/global navigation satellite system (GNSS) signals (hereinafter, referred to as 'GPS signals').

As the first antenna outputs a plurality of frequency signals, an intermodulation distortion signal is included in a signal received by the second antenna, and therefore, receiving sensitivity may be degraded. In more detail, intermodulation distortion (IMD) refers to a phenomenon in which an output frequency component obtained by combining the sum and difference between harmonic frequencies of two different input frequency signals is created in a frequency signal processing process through a nonlinear device. The IMD is a phenomenon that does not occur when one frequency signal is processed but occurs when two or more frequency signals are simultaneously processed.

The IMD results from transmission power leaking from a transmission path (Tx path) of the first antenna to a reception path (Rx path) of the second antenna. In order to control the IMD, a receiving module is configured to include an LC lumped element.

Figure 6:
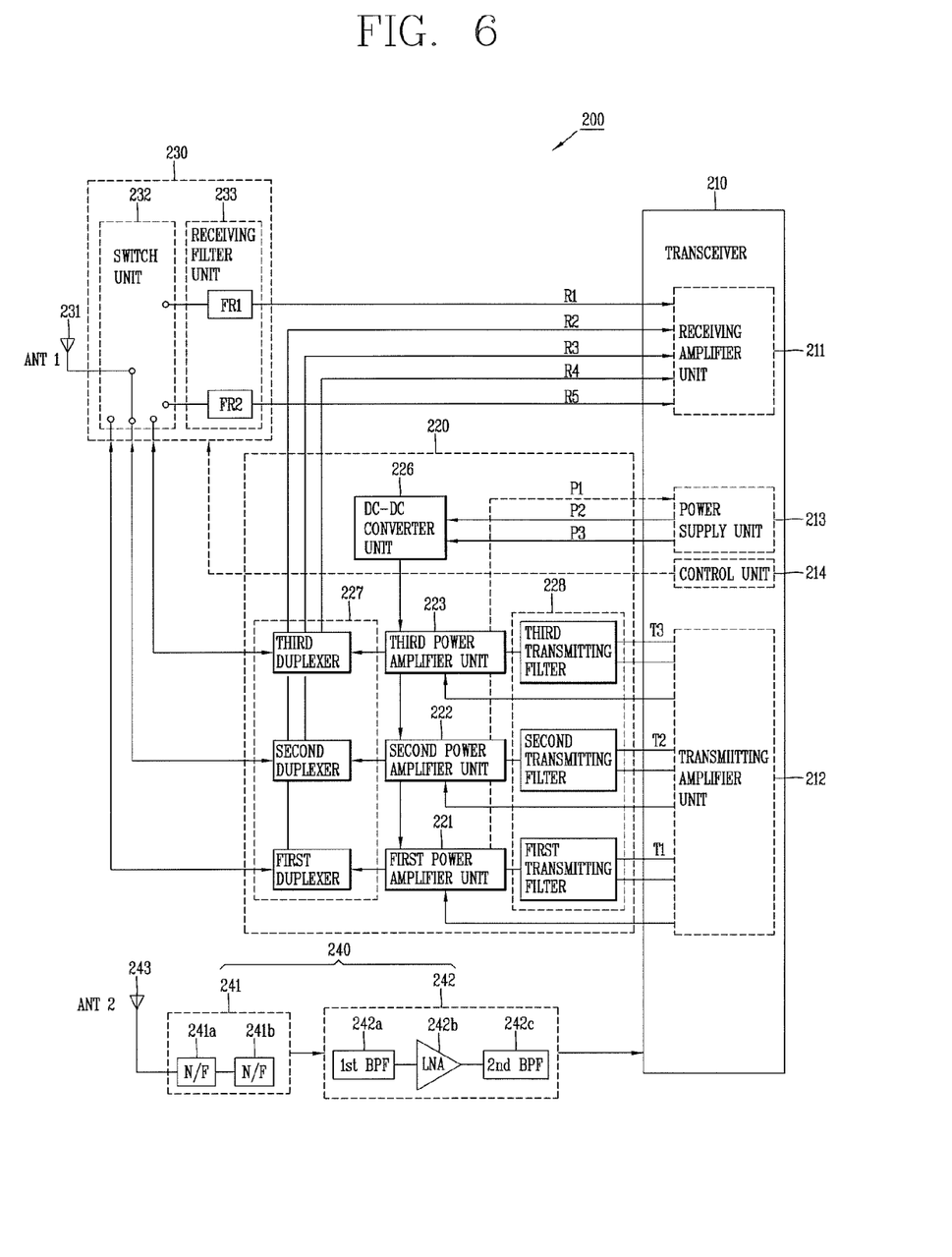
FIG. 6 is a block configuration diagram illustrating a mobile terminal related to a wireless communication unit of FIG. 1 according to an embodiment of the present invention.
Figure 7:
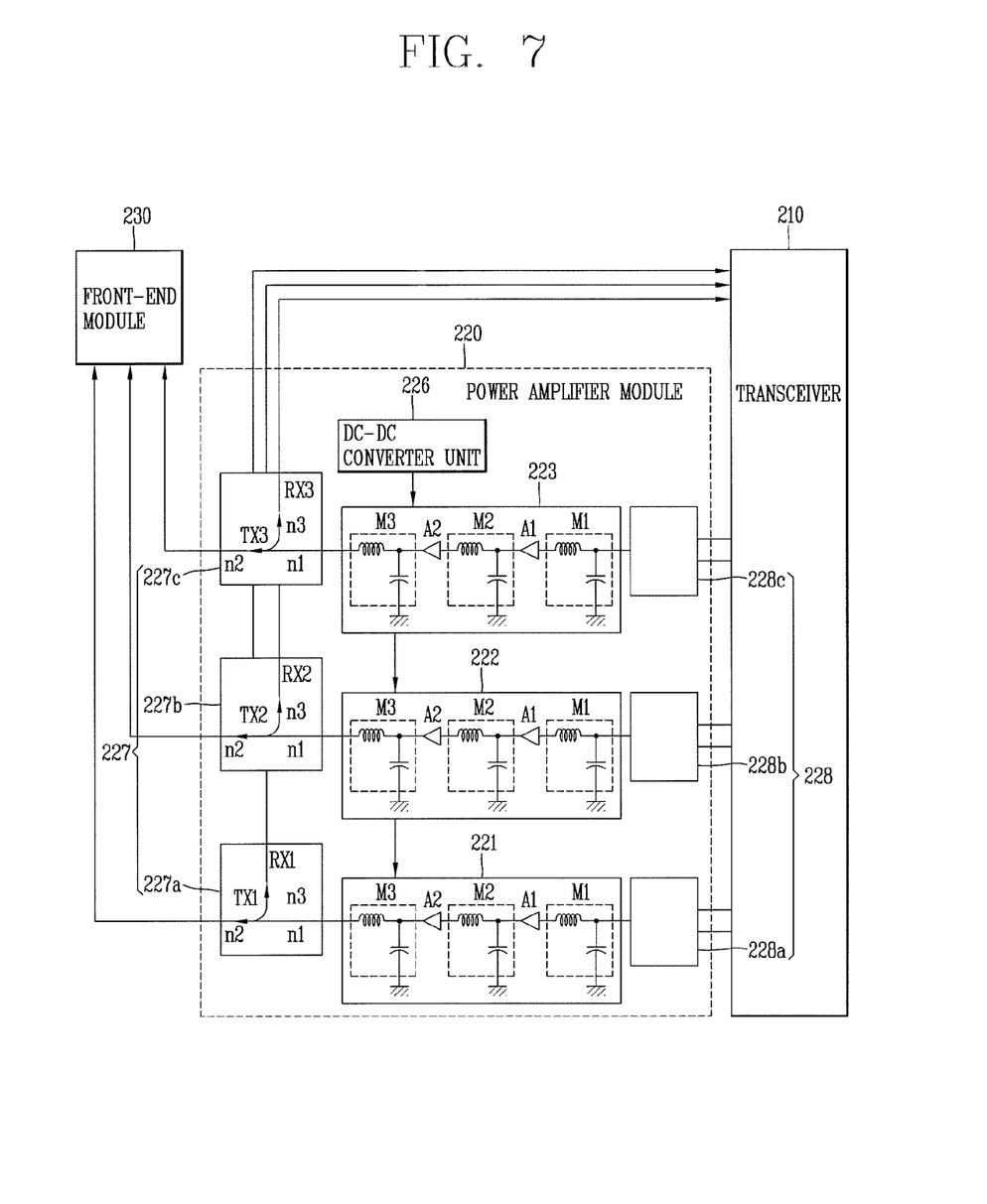
FIG. 7 is a block diagram illustrating the detailed configuration of a power amplifier module shown in FIG. 6.

Hereinafter, this will be described in detail with reference to FIGS. 6 and 7. In particular, FIG. 6 is a block configuration diagram illustrating a mobile terminal 200 related to the wireless communication unit of FIG. 1 according to an embodiment of the present invention. FIG. 7 is a block diagram illustrating the detailed configuration of a power amplifier module shown in FIG. 6.

As shown, the mobile terminal 200 includes a transceiver 210, a power amplifier module 220 and a front-end module 230. The transceiver 210 has a plurality of output terminals, and selectively outputs a first or second signal through any one of the output terminals.

The power amplifier module 220 is disposed between the transceiver 210 and the front-end module 230. Further, the front-end module 230 connects the power amplifier module 220 to a first antenna 231.

Hereinafter, the transceiver 210, the power amplifier module 220 and the front-end module 230 will be described in detail. The first and second signals output from the transceiver 210 are electromagnetic signals of different communication services.

Here, if the frequency bands of the first and second signals are equal to each other and the kinds of communication services are different from each other, the communication services are defined as different communication services. For example, GSM 850, CDMA 850, WCDMA 850 and US-PCS 1900 are different communication services.

However, if the frequency bands of the first and second signals are different from each other and the kinds of communication services are equal to each other, the communication services are defined as the same communication service. For example, GSM 850, GSM 900, GSM 1800 and GSM 1900 communication services are the same communication service using the GSM scheme. CDMA 850 and CDMA 1900 are the same communication service using the CDMA scheme. WCDMA 850, WCDMA 900 and WCDMA 1900 are the same communication service using the WCDMA scheme. US-PCS 1900 is a communication service using the US-PCS scheme.

As shown, the transceiver 210 includes a receiving amplifier unit 211, a transmitting amplifier unit 212, a power supply unit 213 and a control unit 214.

The receiving amplifier unit 211 amplifies electromagnetic signals transmitted from the front-end module 230. The receiving amplifier unit 211 has a plurality of input terminals, and the plurality of input terminals include first to fifth input terminals R1 to R5.

For example, the signals input to the first to fifth input terminals R1 to R5 may have frequency bands of 935 to 960 MHz, 869 to 894 MHz, 1930-1990 MHz, 1805 to 1880 MHz and 2110 to 2170 MHz, respectively.

The transmitting amplifier unit 212 driving-amplifies the electromagnetic signal so that the power amplifier module 220 high-power amplifies the electromagnetic signal, and transmits the driving-amplified electromagnetic signal to the power amplifier module 220. The transmitting amplifier unit 212 has first to third output terminals T1 to T3 corresponding to a plurality of output terminals.

For example, the signals output from the first to third output terminals T1 to T3 may have frequency bands of 824 to 915 MHz, 1710 to 1910 MHz and 1920 to 1980 MHz, respectively.

The control unit 214 generates a control signal for controlling switching operations on signal transmission paths inside the front-end module 230. That is, the control unit 214 performs a function of switching on/off for n paths of the switch unit 232. For example, when the control signal is configured to have 4 bits, 16 different control signals from 0000 to 1111 may be formed. Thus, when the control signal is configured to have n bits, the control unit 214 can perform a switching control on a maximum of $2^n$ paths.

The power amplifier module 220 has at least one power amplifier unit, and the at least one power amplifier unit includes first to third power amplifier units 221 to 223. The power amplifier module 220 further includes a DC-DC converter unit 226, a duplexer unit 227 and a transmitting filter unit 228.

The first to third power amplifier units 221 to 223 are connected to any one of the output terminals T1 to T3 of the transceiver 210, and amplify a signal input within a predetermined frequency band. For example, the first power amplifier unit 221 amplifies the first and second signals.

The first and second signals are electromagnetic signals which are included in the predetermined frequency band and have frequency bands adjacent or equal to each other. The first and second signals are also electromagnetic signals in adjacent frequency bands. For example, the first signal may be one of electromagnetic signals using the LTE B4 communication service in a first frequency band, and the second signal may be an electromagnetic signal using the US-PCS communication service in a second frequency band. That is, the first frequency band may be Tx 1710 to 1755 MHz and the second frequency band may be Tx 1850 to 1910 MHz.

The second power amplifier unit 222 amplifies third and fourth signals having different frequency bands from the first and second signals. The third and fourth signals are electromagnetic signals in frequency bands adjacent to each other. For example, the third signal may be one of electromagnetic signals using the GSM 850, CDMA 850 and WCDMA 850 communication services in a third frequency band, and the fourth signal may be any one of electromagnetic signals using the GSM 900 communication service in a fourth frequency band. The third frequency band may be 824 to 849 MHz and the fourth frequency band may be 890 to 915 MHz.

The third power amplifier unit 223 amplifies one or more electromagnetic signals having different frequency bands from the first to fourth signals. For example, the one or more electromagnetic signals are electromagnetic signals using the WCDMA 2100 and LTE 2100 communication services in a fifth frequency band. Here, the fifth frequency band may be 1920 to 1980 MHz.

The mobile terminal 200 may further include a GPS/GNSS receiver unit 240. For example, the GPS/GNSS receiver unit 240 may directly receive position information obtained by receiving time and distance from a GPS satellite through an electromagnetic signal, or may receive the position information through a mobile communication network.

Both terminals of the GPS/GNSS receiver unit 240 are connected to the transceiver 210 and a GPS/GNSS antenna (hereinafter, referred to as a 'second antenna') 243, respectively. The GPS/GNSS receiver unit 240 has an IMD removing filter 241 and a receiving filter 242.

Here, the second antenna 243 receives the electromagnetic signal through the GPS satellite or mobile communication network in a frequency band of 1574.42 to 1576.52 MHz. When the GPS/GNSS receiver unit 240 operates as a GNSS receiver unit, the frequency band may be 1597.5 to 1605.8 MHz.

Since the second antenna 243 requires circular polarization characteristics, the second antenna 243 is provided to the mobile terminal 200 separately from the first antenna 231. The receiving filter 242 allows signals in the frequency band to pass therethrough, and blocks signals except the signals in the frequency band.

The receiving filter 242 may include a low noise amplifier (LNA) 242b and at least one receiving filter 242a and 242c, etc. The receiving filter 242 includes at least one active element.

As described above, the IMD occurs due to the leakage of the transmission power from the transmission path (Tx path) of the first antenna to the reception path (Rx path) of the second antenna. Thus, the receiving module includes the IMD removing filter 241 in order to control the IMD signal included in the signal received by the second antenna.

The IMD removing filter 241 may be configured with a first notch filter 241a and a second notch filter 241b. Each of the first and second notch filters 241a and 241b may include an LC lumped element. Therefore, the attenuation rate of the filter is about 0.2 dB or so. The IMD removing filter 241 is formed as described above, so that the IMD signal is included in the third signal, thereby preventing the degradation of reception sensitivity.

As shown in FIG. 7, each of the first to third power amplifier units 221 to 223 may have a plurality of power amplifiers A1 and A2 for high-power amplification. Here, the first power amplifier A1 performs impedance matching through a first input matching circuit M1 and a first output matching circuit M2, and the second power amplifier A2 performs impedance matching through a second input matching circuit M2 and a second output matching circuit M3.

Each of the first and second input matching circuits M1 and M2 and the first and second output matching circuits M2 and M3 is a fixed matching circuit which is configured with the combination of an inductor and a capacitor, and has a fixed capacitance value. The fixed matching circuit can reduce a space which the fixed matching circuit occupies inside the mobile terminal, and decrease a delay time due to the mode conversion of a communication service, as compared with a variable matching circuit.

The first to third power amplifier units 221 to 223 according to FIGS. 6 and 7 amplify the electromagnetic signal in a frequency band including a plurality of communication services, thereby providing the mobile terminal 200 that can efficiency provide the plurality of communication services.

That is, the power amplifiers amplifying an electromagnetic signal of communication services provided not only in the same frequency band but also in an adjacent frequency band is disposed to share the electromagnetic signal. Thus, the total number of power amplifiers is decreased, thereby reducing the size and power consumption of the entire power amplifier unit.

The DC-DC converter unit 226 receives DC power supplied from the power supply unit 213, and supplies voltage-converted DC power to the power amplifiers of each of the first to third power amplifier units 221 to 223.

The duplexer unit 227 is disposed between the front-end module 230 and the first to third power amplifier units 221 to 223, and mutually separates a first transmission signal and a first reception signal corresponding to the first transmission signal. Here, the first transmission signal is the first or second signal selectively output from the transceiver 210.

The duplexer unit 227 receives the first transmission signal input through a first terminal connected to the power amplifier units 221 to 223, and outputs the received first transmission signal to a second terminal connected to the front-end module 230. On the other hand, the duplexer unit 227 receives a first reception signal input from the front-end module 230 through the second terminal, and outputs the received first reception signal to a third terminal connected to the transceiver 210.

The duplexer unit 227 includes first to third duplexers 227a and 227c, and each of the first to third duplexers 227a and 227c has first to third terminals. The first transmission signal TX1 to TX3 is transmitted from the first terminal n1 to the second terminal n2, and the first reception signal RX1 to RX3 is transmitted from the second terminal n2 to the third terminal n3.

Referring back to FIGS. 6 to 7, the transmitting filter unit 228 is disposed between the transceiver 210 and the first to third power amplifier units 221 to 223. The transmitting filter unit 228 allows signals in a predetermined frequency band to pass therethrough, and blocks signals except the signals in the predetermined frequency band. The transmitting filter unit 228 may be implemented as a surface acoustic wave (SAW) filter.

The transmitting filter unit 228 includes a first transmitting filter 228a allowing signals in the first and second frequency bands to pass therethrough, a second transmitting filter 228b allowing signals in the third and fourth frequency bands to pass therethrough, and a third transmitting filter 228c allowing signals in the fifth frequency band to pass therethrough.

Each of the first to third transmitting filters 228a to 228c may be implemented in a multi-input single-output form having two input lines and one output line. One of the two input lines corresponds to a delayed line having a different line length from the other input line, and has a different phase value from the other input line. The first to third transmitting filters 228a and 228c in the multi-input single-output form having the delayed line have characteristics strong against noise. The front-end module 230 further includes a switch unit 232 and a receiving filter unit 233.

The antenna 231 has at least one antenna, and may transmit or receive the electromagnetic signal of the communication service in the frequency band through the at least one antenna. The antenna 231 has two or more antennas, and may transmit or receive an electromagnetic signal in at least one frequency band through each antenna.

The switch unit 232 is disposed between the antenna 231 and the receiving filter unit 233, and connects any one of a plurality of paths between the power amplifier module 220 and the antenna 231 or between the antenna 231 and the transceiver 210.

The receiving filter unit 233 allows a second reception signal received from the antenna 231 and input to the transceiver 210 to pass therethrough, and blocks signals in frequency bands except the frequency band to which the second reception signal belongs.

The receiving filter unit 233 includes first and second receiving filters FR1 and FR2. Each of the first and second receiving filters FR1 and FR2 allows signals in second and fourth reception frequency bands BRX2 and BRX4 to pass therethrough, and blocks signals in reception frequency bands except the second and fourth reception frequency bands BRX2 and BRX4. For example, the second and fourth reception frequency bands BRX2 and BRX4 may be 935 to 960 MHz and 1805 to 1880 MHz, respectively. The signals of the second and fourth reception frequency bands BRX2 and BRX4 may be reception signals of GSM 900 and GSM 1800 communication services, respectively.

Figure 8:
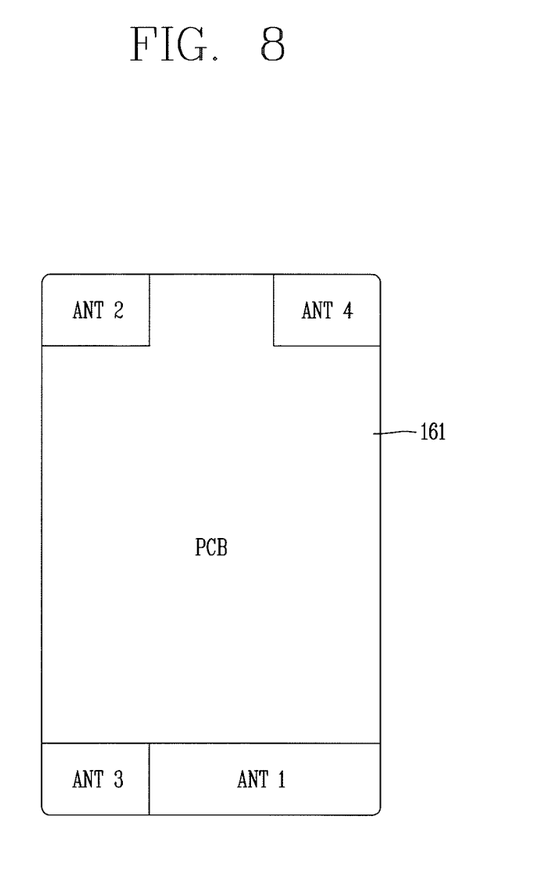
FIG. 8 is a conceptual view illustrating another example in which antennas are arranged in a mobile terminal.
Figure 9:
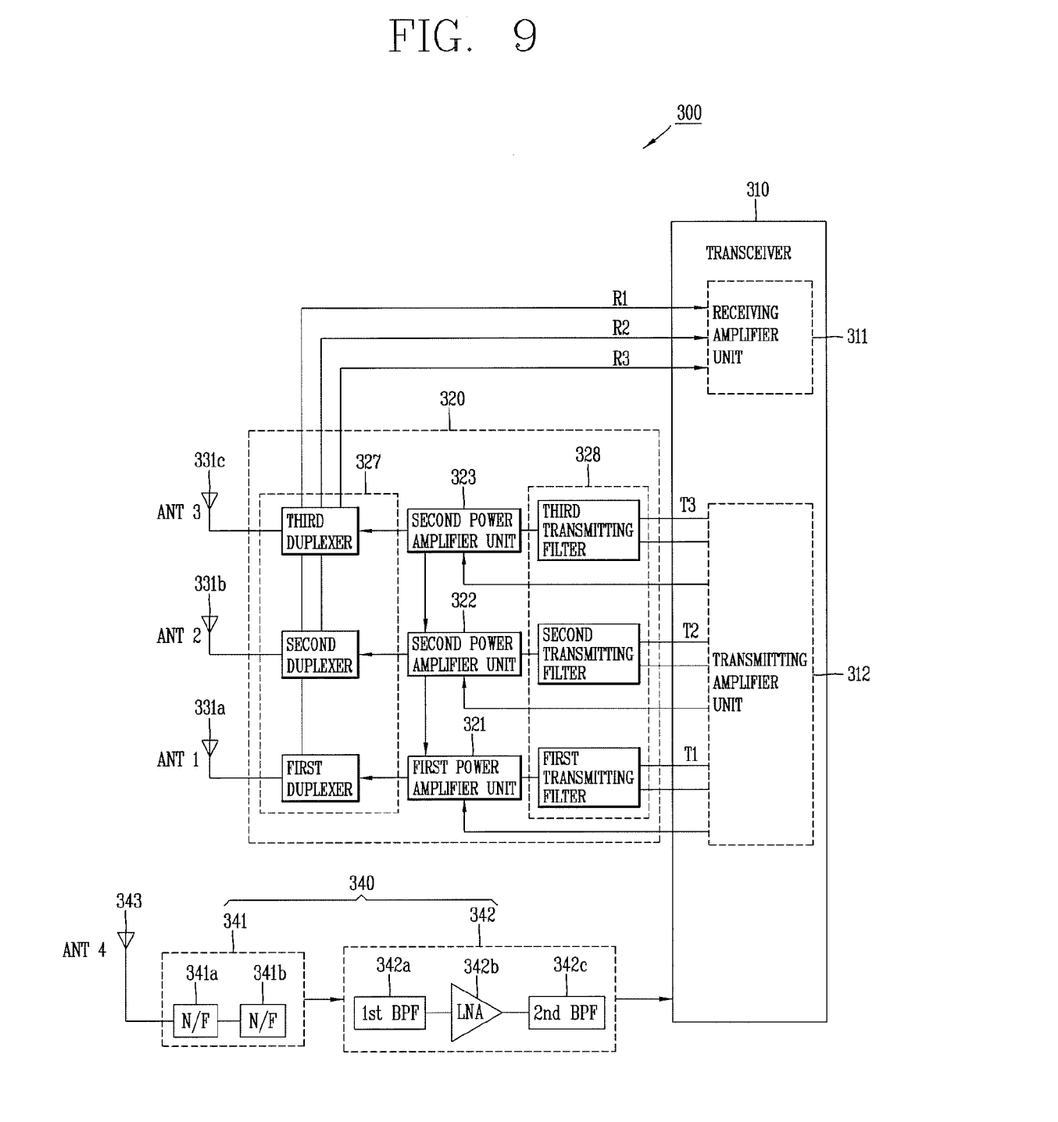
FIG. 9 is a block configuration diagram illustrating a modification of the mobile terminal shown in FIG. 6.

FIG. 8 is a conceptual view illustrating another example in which antennas are arranged in a mobile terminal. FIG. 9 is a block diagram illustrating a modification of the mobile terminal shown in FIG. 6.

Hereinafter, differences between the mobile terminal 300 of the modification and the mobile terminal 200 shown in FIGS. 5 to 7 will be described. FIG. 8 illustrates that the antennas can be disposed in a predetermined region of the mobile terminal. A first antenna is disposed at a right lower end in the mobile terminal, and may be connected to a circuit board having a ground so that the circuit board supplies power thereto.

On the other hand, a second antenna may be disposed at a left upper end in the mobile terminal. A third antenna may be disposed at a left lower end in the mobile terminal, and a fourth antenna may be disposed at a right upper end in the mobile terminal. Thus, isolation characteristics can be improved due to the antennas arranged to be spaced apart from each other as described above.

The mobile terminal 300 may be a multi-mode and multi-band mobile terminal that provides, for example, US-PCS, EGRPS, UMTS and CDMA communication services. The mobile terminal 300 may further provide an LTE communication service. The mobile terminal 300 may be a multi-mode and multi-band mobile terminal that integrally provides 2G and 3G communication services.

The first antenna may be formed to provide the LTE communication service. The second antenna may be formed to provide the US-PCS communication service. The third antenna may be formed to provide the CDMA communication service. The fourth antenna may be an antenna that receives GPS/GNSS signals (hereinafter, referred to as 'GPS signals').

Referring to FIG. 9, the mobile terminal 300 may include a power amplifier module 320 connecting first to third antennas 331a, 331b and 331c and the transceiver 310 therethrough. Both terminals of a GPS/GNSS receiver unit 340 are connected to the transceiver 310 and a GPS/GNSS antenna (hereinafter, referred to as a 'receiving antenna') 343, respectively. The GPS/GNSS receiver unit 340 has an IMD removing filter 341 and a receiving filter 342. The receiving filter 342 allows signals in the frequency band to pass therethrough, and blocks signals except the signals in the frequency band.

The receiving filter 342 includes an LNA 342b and at least one receiving filter 342a and 342c, etc. The receiving filter 342 includes at least one active element. Here, the receiving antenna 343 receives the electromagnetic signal in a frequency band of 1574.42 to 1576.62 MHz through the GPS satellite or mobile communication network. When the GPS/GNSS receiver unit 340 operates as a GNSS receiver unit, the frequency band may be 1597.5 to 1605.8 MHz.

The transceiver 310 may have a receiving amplifier unit 311 and a transmitting amplifier unit 312 as described above. Although not shown in this figure, the transceiver 310 may include a power supply unit and a control unit.

First to third antennas 331a, 331b and 331c are connected to first to third duplexers, respectively. A front-end module may be disposed between any one antenna and the power amplifier module 320. The front-end module may include a switch unit capable of switching each path. The switch unit may be implemented in the form of a single pole double throw (SPDT) switch so as to switch the path between the switch unit and each power amplifier unit or duplexer.

The first to third antennas 331a, 331b and 331c may be formed to output first to third signals, respectively. The first and second signals may be electromagnetic signals which are included in the predetermined frequency band and have frequency bands adjacent or equal to each other.

When the first and second signals are electromagnetic signals in adjacent frequency bands, for example, the first signal may be one of electromagnetic signals using the LTE B4 communication service in a first frequency band, and the second signal may be an electromagnetic signal using the US-PCS communication service in a second frequency band. That is, the first frequency band may be Tx 1710 to 1755 MHz and the second frequency band may be Tx 1850 to 1910 MHz.

In this instance, the IMD occurs due to the leakage of the transmission power from the transmission path (Tx path) of the first and second antennas to the reception path (Rx path) of the fourth antenna. That is, the receiving module includes the IMD removing filter 341 in order to control the IMD signal included in the signal received to the receiving antenna.

The IMD removing filter 341 may be configured with first and second notch filters 341a and 341b. Each of the first and second notch filters 341a and 341b may include an LC lumped element. Therefore, the attenuation rate of the filter is about 0.2 dB or so.

In the mobile terminal according to the embodiments configured as described above, it is possible to prevent reception sensitivity from being degraded due to an IMD signal. Thus, it is possible to reduce the size of the mobile terminal capable of simultaneously processing signals in multiple frequency bands and to promote stability of performance.

Further, it is possible to attenuate signals causing IMD, using the arrangement of antennas. Accordingly, the amplitude of the IMD signal is decreased within an acceptable range, so that it is possible to prevent the reception sensitivity from being degraded due to the IMD signal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a transceiver having a plurality of output terminals;
a plurality of power amplifier units respectively connected to the plurality of output terminals, and configured to amplify a first or second signal output by the output terminals and to output the amplified first or second signal to at least one antenna connected to the plurality of power amplifiers;
a transmitting filter unit disposed between the transceiver and the power amplifier units, and configured to allow signals in a predetermined frequency band to pass therethrough and to block signals except the signals in the predetermined frequency band; and
a receiving module configured to receive a third signal through a receiving antenna disposed to be spaced apart from the at least one antenna and to output the received third signal to the transceiver,
wherein the transmitting filter unit is implemented in a multi-input single-output form having two input lines and one output line,
wherein one of the two input lines corresponds to a delayed line having a different line length from the other input line, and has a different phase value from the other input line,
wherein the receiving module comprises an IMD (intermodulation distortion) removing filter and a receiving filter,
wherein the IMD removing filter comprises first and second notch filters configured to control an IMD signal included in the third signal due to the output of the first or second signal, each of the first and second notch filters including an LC lumped element,
wherein the receiving filter comprises first and second band pass filters and a LNA (Low Noise Amplifier) disposed between the first and second band pass filters, and
wherein the first and second notch filters are disposed between the receiving antenna and the first band pass filter.

2. The mobile terminal of claim 1, wherein an attenuation rate of the first or second notch filter is about 0.2 dB.

3. The mobile terminal of claim 1, wherein the first or second signal are in a same frequency band.

4. The mobile terminal of claim 1, wherein the first or second signal includes at least one of frequency bands of 1710 to 1755 MHz and 1850 to 1910 MHz.

5. The mobile terminal of claim 1, wherein the first signal includes a frequency band of 1710 to 1755 MHz, and the second signal includes a frequency band of 1850 to 1910 MHz.

6. The mobile terminal of claim 1, wherein the first or second signal are in frequency bands adjacent to each other.

7. The mobile terminal of claim 6, wherein the third signal includes any one of frequency bands of 1574 to 1577 MHz and 1597 to 1606 MHz.

8. The mobile terminal of claim 4, wherein the third signal includes any one of frequency bands of 1574 to 1577 MHz and 1597 to 1606 MHz.

9. A mobile terminal, comprising:
a transceiver having a plurality of output terminals, and configured to output a first or second signal through any one of the output terminals;
a plurality of power amplifier units connected to any one of the output terminals and configured to amplify an input signal and output the amplified signal to a first antenna;
a transmitting filter unit disposed between the transceiver and the power amplifier units, and configured to allow signals in a predetermined frequency band to pass therethrough and to block signals except the signals in the predetermined frequency band; and
a receiving module configured to receive a third signal through a second antenna spaced apart from the first antenna and to output the received third signal to the transceiver,
wherein the transmitting filter unit is implemented in a multi-input single-output form having two input lines and one output line,
wherein one of the two input lines corresponds to a delayed line having a different line length from the other input line, and has a different phase value from the other input line,
wherein the receiving module comprises an IMD (intermodulation distortion) removing filter and a receiving filter, wherein the IMD removing filter comprises first and second notch filters configured to control an IMD signal included in the third signal due to the output of the first or second signal, each of the first and second notch filters including an LC lumped element, wherein the receiving filter comprises first and second band pass filters and a LNA (Low Noise Amplifier) disposed between the first and second band pass filters, wherein the first and second notch filters are disposed between the receiving antenna and the first band pass filter, and wherein the first and second antennas are disposed at the opposite ends of the mobile terminal, respectively, such that isolation characteristics are improved by the separated arrangement between the first and second antennas.

10. The mobile terminal of claim 9, further comprising:
a switch module disposed between the plurality of power amplifier units and the first antenna so as to form a plurality of signal transmission paths between the plurality of power amplifier units and the first antenna, and configured to switch the plurality of signal transmission paths so that the plurality of signals are applied to the first antenna through any one of the plurality of signal transmission paths.

11. The mobile terminal of claim 9, wherein an attenuation rate of the first or second notch filter is about 0.2 dB.

12. The mobile terminal of claim 9, wherein the first or second signal are in frequency bands adjacent to each other.

13. The mobile terminal of claim 9, wherein the first or second signal are in a same frequency band.

14. The mobile terminal of claim 9, wherein the first or second signal includes at least one of frequency bands of 1710 to 1755 MHz and 1850 to 1910 MHz.

15. The mobile terminal of claim 9, wherein the first signal includes a frequency band of 1710 to 1755 MHz, the second signal includes a frequency band of 1850 to 1910 MHz, and the third signal includes any one of frequency bands of 1574 to 1577 MHz and 1597 to 1606 MHz.

16. The mobile terminal of claim 14, wherein the third signal includes any one of frequency bands of 1574 to 1577 MHz and 1597 to 1606 MHz.

* * * * *